Dec. 20, 1949  H. L. BARBER ET AL  2,492,027
MACHINE FOR BARBING APPLICATOR STICKS
Filed Dec. 31, 1945
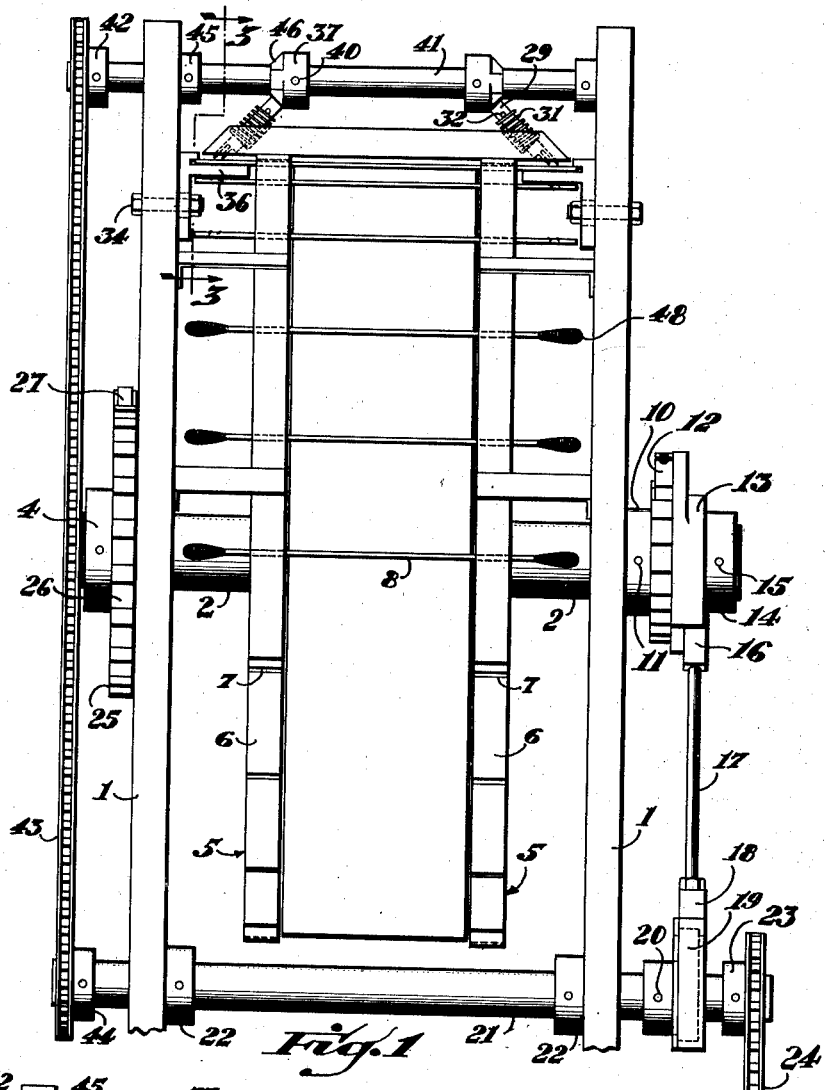
Fig. 1
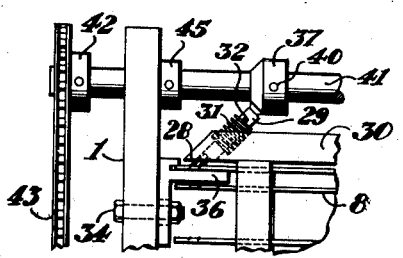
Fig. 2
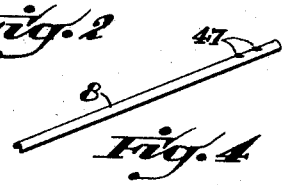
Fig. 4
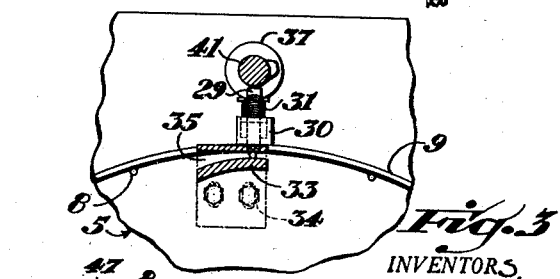
Fig. 3
Fig. 5
INVENTORS
Hiram L. Barber
BY George L. Sellars
Wood, Arey, Herron & Evans
Attorneys.

Patented Dec. 20, 1949

2,492,027

UNITED STATES PATENT OFFICE 2,492,027

MACHINE FOR BARBING APPLICATOR STICKS

Hiram L. Barber, Newtown, and George L. Sellars, Milford, Ohio

Application December 31, 1945, Serial No. 638,597

4 Claims. (Cl. 144—2)

This invention relates to a machine for making swab sticks, that is, slender wooden sticks which are adapted to have swabs of cotton wrapped about one or both ends thereof in order that the sticks may be used as medical applicators.

The invention particularly is directed to a machine which, rapidly and conveniently, will provide one or more barbs upon a wooden swab stick adjacent one or both its ends, whereby firm and secure attachment is facilitated of the cotton to the stick. In many instances the cotton is wound upon the stick by hand just prior to the time the swab is to be used. On the other hand, the barbing apparatus of the present invention also is adapted to be used in conjunction with a cotton winding mechanism which, after the stick is barbed appropriately, is effective for associating the cotton swab with the stick. For instance, one suitable cotton swab forming mechanism is shown in our copending application Serial No. 638,596. However, inasmuch as the swab forming apparatus forms no part of the present invention, only the barbing of the sticks, and the mechanism therefor, are disclosed here in detail.

The invention, briefly, contemplates a machine having a stick conveyor comprising a series of stick receiving notches or seats therein. The sticks, by means of a suitable hopper, are placed within these seats and upon advancement of the conveyor drum, are delivered to the barbing station. A belt, band or other suitable device is employed in conjunction with the conveyor to hold the sticks in position once they have been seated properly.

The barbing apparatus of this invention comprises one or more knives arranged angularly with respect to the axis of the sticks carried by the drum and also arranged to be adjacent the ends of the supported sticks whereby barbs are placed thereon at points suitable for engagement thereof by the cotton fibers. During this operation the sticks are stationary and are held against movement. For notching the sticks to provide the barbs the knives are moved into angular engagement with the sticks whereby slivers of wood are struck up from the stick peripheries, after which the knives retract and the stick moves on. The barbing knife or knives are actuated by a cam switch which is driven in timed relationship to conveyor movement. Preferably the conveyor moves step-wise whereby a stick is delivered to the barbing station, engaged by the knife and then advanced beyond the barbing station as the next stick is moved into position by the conveyor.

In the preferred embodiment of the invention the conveyor is made up of two circular plates which are spaced apart from one another, somewhat less than the overall length of the sticks which are to be notched. These plates are mounted concentrically upon a drive shaft and the peripheries of the plates contain notches or grooves which are in alignment to form the seats within which the sticks are received. The conveyor is advanced, rationally, by means of a pawl and ratchet or other suitable means for presenting the sticks serially to the barbing station.

The apparatus is effective for forming a barb upon a stick which is quite similar to a barb on a fish hook. Such a barb not only facilitates attachment of initial cotton fibers to the stick periphery but subsequently prevents detachment of the formed swab from the stick.

From the foregoing principles upon which the invention is predicated and from the following detailed description of the drawings in which a preferred embodiment of the invention is disclosed, those skilled in the art readily will comprehend the various modifications to which the invention is susceptible.

In the drawings:

Figure 1 is an elevation of the machine. In this machine the barbs are in a retracted position.

Figure 2 is a fragmentary view similar to Figure 1, showing a stick in the process of being barbed.

Figure 3 is a cross sectional view taken on the line 3—3 of Figure 1.

Figure 4 is a perspective view of a stick having a pair of barbs placed adjacent one end thereof as produced by a machine of the present invention.

Figure 5 is an enlarged fragmentary view of the barbed portion of a stick.

The apparatus shown in the drawings is adapted particularly for providing two barbs adjacent each end of a stick. However, if desirable, only one barb may be provided in place of two, or only one barb may be provided at only one end of the stick. Thus, throughout the specification the term "barb" or "knife" is intended to include the plural and, conversely, the plural is intended to include the singular.

As shown in Figure 1, the machine comprises a pair of side plates 1—1 which are spaced apart from one another and suitably supported so as to provide a frame for the mechanism as well as journals for various rotating shafts thereof. One of these shafts 2 extend across the side plates 1—1 and projects endwisely beyond the side plates where, at one side of the machine, it carries a ratchet mechanism indicated generally at 4. The shaft 2 carries a conveyor drum indicated generally at 5. This structure, in the embodiment disclosed, consists of two circular plates 6—6 concentrically mounted on the shaft 2 and spaced apart from one another a distance somewhat less than the overall length of the sticks which are to be barbed in the apparatus. The plates 6 have notches or grooves 7—7 at their periphery, these grooves or notches being in alignment with one another whereby they cooperate to form seats for the sticks which are indicated generally at 8 in the machine.

A stationary band 9 may be installed between the discs 6—6 to extend over the sticks 8 inserted in the notches 7 therefor, as shown in Figure 3, for the purpose of holding the sticks in their seats. It will be understood that the band 9 may extend only part way around the periphery of the conveyor drum and that a hopper or other loading apparatus (not shown) may be located adjacent the starting part of the band to feed sticks serially to the notches.

The ratchet assembly at one end of the drive shaft 2 consists of a ratchet 10 which is fixed to the shaft 2 as by means of a pin 11, a pawl 12 carried on a rocker arm 13 which is rotatably supported by the shaft 2, and a collar 14 which is pinned to the shaft as at 15 to hold the rocker arm 13 in a position adjacent the ratchet 10. Rocker arm 13 has a lower portion 16 which is engaged by a connecting rod 17, the opposite end of which is fastened to a follower 18 which is rotatably associated with an eccentric 19. The eccentric 19 is mounted, by means of a pin 20, on a cross shaft 21 journalled in the side plates 1—1 at a point removed from the periphery of the conveyor drum 5. This shaft is held against movement axially by means of collars 22—22 and it is driven by means of a sprocket 23 through a chain 24 which is operated from a suitable source of power, for instance, a portable motor driven speed reducer. Rotation of the shaft 21 causes the eccentric 19 to oscillate the connecting rod 17, thereby operating the rocker arm 13, the pawl of which upon each oscillation advances the conveyor 5 a distance corresponding to the spacing of the notches 7 of the drum.

For the purpose of preventing over-travel of the drum through its momentum a detent mechanism is provided on the side of the machine opposite the pawl and ratchet mechanism. This detent assembly 4 comprises a disc 25 having grooves or notches 26 in its periphery, these grooves or notches being spaced apart from one another in accordance with the rate of advance of the disc by the ratchet mechanism. A roller 27 urged by means of a spring (not shown) toward the notches serves as the yieldable detent which serially engages the notches and thereby prevents over-travel of the conveyor.

Barbing of the sticks is provided by knives 28. These are in the form of knife-like projections extending from the extremities of a stub shaft 29 which is slidably mounted in a bore on a guide piece 30. The bore is inclined angularly with respect to the longitudinal axis of the stick; the edges of the knives therefore engage the stick as though they were to shear it on an angle. Stub shaft 29 is biased away from the sticks, to effect withdrawal of the knives following a barbing operation by means of a compression spring 31 having one end seated on a shoulder in the guide piece 30 and the opposite end bearing on a pin 32 which extends laterally through the stub shaft.

The endwise portions of the sticks are supported end guided by table members 33 (Figure 3) which are fastened to the side frames by bolts 34. These tables may be arranged with respect to the path of travel of the stick in the conveyor so as to exert a slight lifting action whereby the sticks may be held stationary and properly supported during the barbing operation. Each table member comprises a groove 35 through which the endwise portion of the stick is free to pass. The groove is of converging configuration with respect to the direction of drum movement whereby entrance of the sticks into the groove is facilitated, and it is to be noted that one of the walls 36 delineating the groove projects laterally to a point beneath the knives where it serves as a table or support to prevent deflection of the stick when the barbs are being cut.

The barbing knives are actuated by means of cam elements 37. These are fastened by pins 40 to a cross shaft 41 which is journalled in the side plates 1. One end of the cross shaft projects beyond one of the side plates where it carries a sprocket 42 which is interconnected through a chain 43 to a sprocket 44 which is fastened to a projecting portion of the cross shaft 21. Collars 45 are pinned to the cam shaft 41 to bear against the side plates and thereby hold the cam shaft against longitudinal movement. Cams 37 have cam faces 46 thereof positioned for actuating the stub shafts 29 of the knives by engaging the endwise portions of these shafts. Depending on the timing of the machine, each cam may have one or more throws whereby it drives the knife assembly toward the stick upon each rotation of shaft 41. When the knives are depressed they engage the stick periphery and throw up barbs 47 as shown in Figure 5. These barbs catch upon the fibers of cotton as the fibers are presented by a suitable cotton feeder and, upon rotation of the stick, the cotton suitably is wound into a swab-like configuration as shown at 48 in Figure 1. Preferably the stub shafts 29 of the barbing knives are squared, or provided with elongated keyways whereby rotation thereof is prevented.

For purposes of illustration the cotton feeder apparatus may be located adjacent the discharge of the barbing station to complete the cotton winding operation immediately after barbing. Swab sticks having wads of cotton on the ends thereof as formed by such apparatus are shown in Figure 1 though the cotton feeder is not disclosed herein. A cotton feeder and swab former which is suitable for use in conjunction with the present equipment is shown in our copending patent application Serial No. 638,596.

Having described our invention, we claim:

1. A machine for barbing sticks comprising; a conveyor, means on the conveyor for supporting the sticks and advancing them through a predetermined path of movement, a stationary table inclined toward and having its leading edge spaced from the said path of movement, a knife arranged above the table at an acute angle thereto and transverse to the said path of movement, and means for moving said knife for a predetermined distance toward the table whereby a barb-like sliver is struck from a stick supported by the table.

2. A machine for barbing sticks comprising; a conveyor for supporting sticks and advancing them through a predetermined path of movement, stationary tables at oposite sides of the conveyor inclined with respect to the said path of movement, a pair of knives arranged over the table at acute angles thereto in opposite directions transverse to the said path of movement, and means for moving said knives a predetermined distance toward said tables unitarily whereby barbing pressure is equalized upon the stick in opposite directions.

3. A machine for barbing sticks comprising; a conveyor, means on the conveyor for supporting the sticks and advancing them through a predetermined path of movement, a table disposed beneath and inclined upwardly with respect to the direction of the said path of movement, a guide element disposed above the table and corresponding to the said path of movement to form in conjunction with the inclined table a converging throat relative to the path of movement, a knife arranged above the table at an acute angle thereto transverse to the path of movement, and means for moving said knife a predetermined distance toward the table to penetrate partially a stick supported by the table whereby a barb-like sliver is struck from the stick.

4. A machine for barbing sticks comprising; a conveyor for supporting sticks and advancing them step by step through a predetermined path of movement, tables at opposite sides of the conveyor disposed beneath and inclined upwardly with respect to the direction of said path of movement, a pair of knives arranged above the table at acute angles in opposite directions transverse to the said path of movement, a shaft, cams mounted on opposite ends of said shaft, one respectively for each of said knives and engaging said knives to actuate the same, and means for driving the cam shaft in timed relationship with the step by step advance of the conveyor to move the knives in unison a predetermined distance toward the table to penetrate partially the opposite ends of the sticks whereby the cutting pressure is equalized upon the stick in opposite directions.

HIRAM L. BARBER.
GEORGE L. SELLARS.

REFERENCES CITED

The following references are of record in the file of this patent:

UNITED STATES PATENTS

| Number | Name | Date |
| --- | --- | --- |
| 250,167 | Parker | Nov. 29, 1881 |
| 687,662 | Seymour | Nov. 26, 1901 |
| 928,289 | Vanvactor | July 20, 1909 |
| 967,683 | Smith | Aug. 16, 1910 |
| 1,175,831 | Spinney | Mar. 14, 1916 |
| 1,925,884 | Steele | Sept. 5, 1933 |
| 2,170,672 | Anderson | Aug. 22, 1939 |